(12) United States Patent
Moon et al.

(10) Patent No.: US 9,948,343 B2
(45) Date of Patent: Apr. 17, 2018

(54) ELECTRONIC DEVICE HAVING WATERPROOF STRUCTURE

(71) Applicant: Samsung Electronics Co., Ltd., Suwon-si, Gyeonggi-do (KR)

(72) Inventors: Heecheul Moon, Seongnam-si (KR); Sangin Baek, Suwon-si (KR); Kwonho Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/196,583

(22) Filed: Jun. 29, 2016

(65) Prior Publication Data
US 2017/0063421 A1   Mar. 2, 2017

(30) Foreign Application Priority Data

Aug. 31, 2015 (KR) .......................... 10-2015-0123178

(51) Int. Cl.
| | |
|---|---|
| *H04M 1/00* | (2006.01) |
| *H04B 1/3888* | (2015.01) |
| *G06F 1/16* | (2006.01) |
| *H04M 1/02* | (2006.01) |
| *H04M 1/18* | (2006.01) |
| *H04B 1/38* | (2015.01) |

(52) U.S. Cl.
CPC ......... *H04B 1/3888* (2013.01); *G06F 1/1656* (2013.01); *H04M 1/0266* (2013.01); *H04M 1/18* (2013.01); *H04B 2001/3894* (2013.01)

(58) Field of Classification Search
USPC ................................... 455/575; 349/12, 110
See application file for complete search history.

(56) References Cited

U.S. PATENT DOCUMENTS

| | | | |
|---|---|---|---|
| 2006/0140439 A1* | 6/2006 | Nakagawa | H04M 1/0266 381/431 |
| 2009/0257010 A1* | 10/2009 | Sakurai | G02F 1/133308 349/110 |
| 2013/0264225 A1 | 10/2013 | Miyagawa | |

(Continued)

FOREIGN PATENT DOCUMENTS

| | | |
|---|---|---|
| EP | 2 993 872 A1 | 3/2016 |
| JP | 2015-065626 A | 4/2015 |

(Continued)

*Primary Examiner* — Ganiyu A Hanidu
(74) *Attorney, Agent, or Firm* — Jefferson IP Law, LLP

(57) ABSTRACT

An electronic device is provided. An electronic device includes a window formed with a transparent or semi-transparent material at an outside of the electronic device, a display disposed on or over the window and having a second side substantially vertical to a first side, and first and second members to absorb or block moisture inflowing from the outside. The window includes a first area corresponding to the display and a second area corresponding to the outside of the display, the first member is disposed on a part of the second area, the second member is disposed on a part of the first member and on a part of the display, a height of the first member is substantially identical to a height of the display, and a width of the first member or a height of the second member is substantially identical to the first side of the display.

17 Claims, 13 Drawing Sheets

(56) References Cited

U.S. PATENT DOCUMENTS

| | | | |
|---|---|---|---|
| 2014/0177154 A1* | 6/2014 | Lee | G06F 1/1637 |
| | | | 361/679.26 |
| 2014/0183473 A1 | 7/2014 | Lee et al. | |
| 2014/0262847 A1* | 9/2014 | Yang | A45C 11/00 |
| | | | 206/37 |
| 2014/0347804 A1 | 11/2014 | Fu et al. | |
| 2015/0042909 A1* | 2/2015 | Sekiguchi | G06F 3/0412 |
| | | | 349/12 |
| 2015/0103478 A1 | 4/2015 | Lee et al. | |
| 2016/0066440 A1 | 3/2016 | Choi et al. | |

FOREIGN PATENT DOCUMENTS

| | | |
|---|---|---|
| KR | 10-1463218 B1 | 11/2014 |
| KR | 10-1516766 B1 | 4/2015 |

* cited by examiner

ELECTRONIC DEVICE HAVING WATERPROOF STRUCTURE

CROSS-REFERENCE TO RELATED APPLICATION(S)

This application claims the benefit under 35 U.S.C. § 119(a) of a Korean patent application filed on Aug. 31, 2015 in the Korean Intellectual Property Office and assigned Serial number 10-2015-0123178, the entire disclosure of which is hereby incorporated by reference.

TECHNICAL FIELD

The present disclosure relates to an electronic device having a waterproof structure of a display device.

BACKGROUND

Various portable terminals such as a recent personal digital assistant (PDA), netbook, notebook, and mobile internet device are growing in the trend of miniaturization and multifunction according to dramatic development in the science and information communication technology.

Therefore, in a smartphone as an example of a portable terminal, an active area of a touch window is continuously increasing and widths of frames surrounding the touch windows (i.e., bezel part) are becoming smaller. Further, studies for reducing the thickness of the smartphone are being actively performed.

If the size of bezel part can be reduced to form a potentially bezel-less portable terminal, it can provide a greater screen size, and aesthetic impression of the portable terminal can be improved.

Water penetration can occur between a window and a window side structure of an electronic device. Accordingly, for the waterproof of electronic device, water penetration paths can be blocked by fixing a tape, sponge, or bonding to a gap or a window setting surface between the window and the window side structure. However, problems may be encountered because the bonding can deteriorate appearance quality because of exposure of the bonding, and the width of the electronic device can increase.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device having a waterproof structure for a display device without increasing the size of the electronic device and a method therefor by protecting moisture from the rear side of the display device, especially from the rear side of a bezel-less display device.

In accordance with an aspect of the present disclosure, an electronic device is provided. The electronic device includes a window formed with a transparent or semi-transparent material at an outside of the electronic device, a display disposed on or over the window and having a second side substantially vertical to a first side, and a first member and a second member configured to absorb or block moisture inflowing from the outside of the electronic device, wherein the window includes a first area corresponding to the display and a second area corresponding to the outside of the display, wherein the first member is disposed at least on a part of the second area, wherein the second member is disposed at least on a part of the first member and at least on a part of the display, wherein a height of the first member is substantially identical to a height of the display, and wherein a width of the first member or a height of the second member is substantially identical to the first side of the display.

In accordance with another aspect of the present disclosure, an electronic device is provided. The electronic device includes a window formed with a transparent or semi-transparent material exposing to an outside of the electronic device, a display disposed on the window, and having a first side and a second side substantially parallel to the first side, a first member disposed substantially on an entire area of the window, and a second member disposed on the first member, wherein the first member comprises a first opening disposed at an outside of the first side and a second opening disposed at an outside of the second side, and wherein the second member absorbs or shuts off moisture from the outside of the electronic device.

In accordance with another of the present disclosure, an electronic device is provided. The electronic device includes a window formed with a transparent or semi-transparent material exposing to an outside of the electronic device, a display disposed on the window, and a first member and a second member configured to absorb or block moisture inflowing from the outside of the electronic device, wherein the first member is disposed at upper right and left areas and lower right and left areas of the window attached to the display, or formed by integrating with one of the display or the window.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
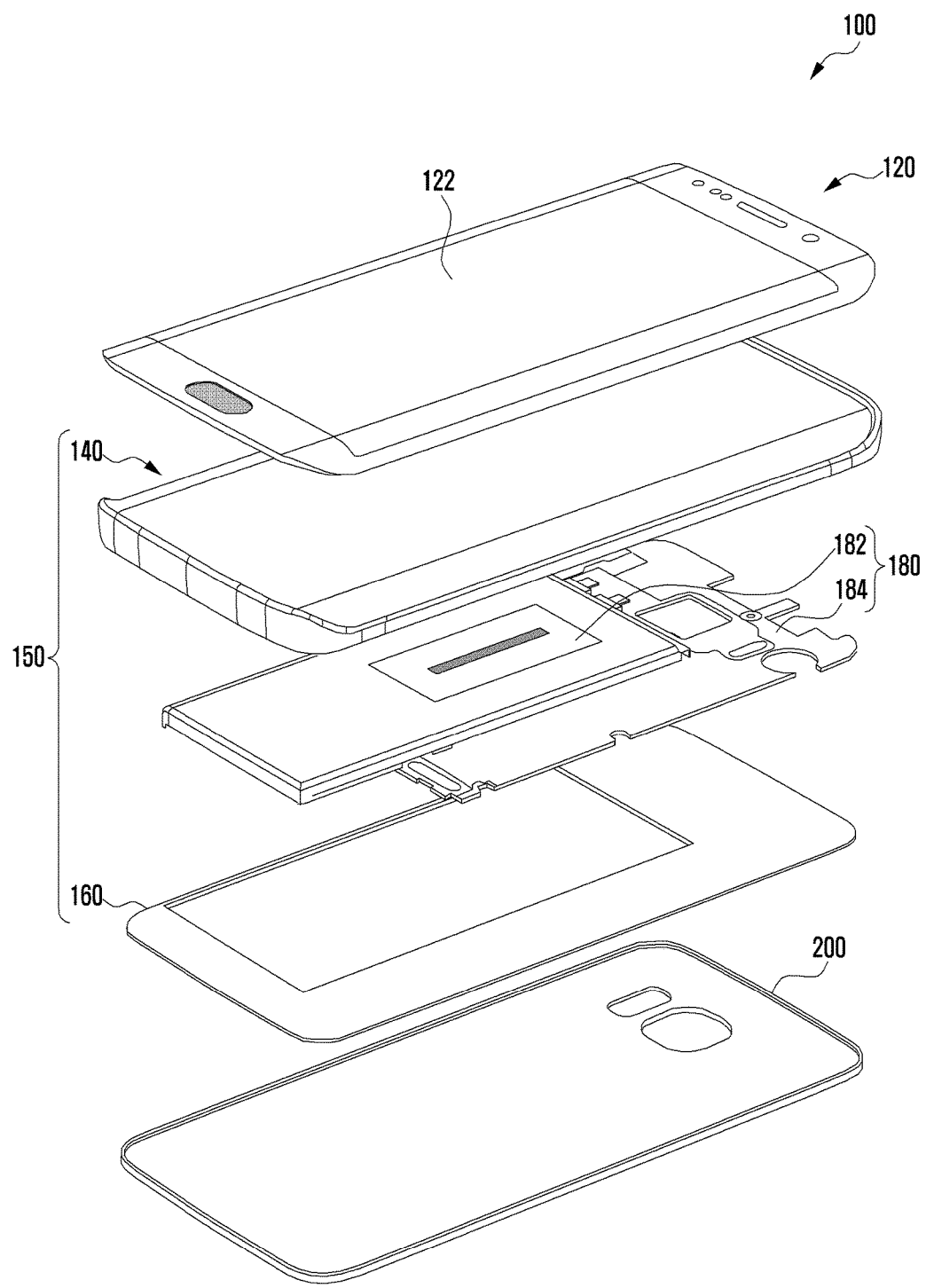
FIG. 1 is a disassembled perspective view illustrating an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expressions such as "include" and "may include" which may be used in the present disclosure denote the presence of the disclosed functions, operations, and constituent elements and do not limit one or more additional functions, operations, and constituent elements. In the present disclosure, the terms such as "include" and/or "have" may be construed to denote a certain characteristic, number, operation, constituent element, component or a combination thereof, but may not be construed to exclude the existence of or a possibility of addition of one or more other characteristics, numbers, operations, constituent elements, components or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

The expression "1", "2", "first", or "second" used in various embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device indicate different user devices although both of them are user devices. For example, without departing from the scope of the present disclosure, a first structural element may be referred to as a second structural element. Similarly, the second structural element also may be referred to as the first structural element.

The expression "configured to" uses in the present disclosure may be replaced, according to situations, with "suitable for", "having the capacity to", "designed to", "adapted to", "made to", or "capable of". The term "configured to" may not always mean "specially designed to". In some situations, "device configured to" may mean that the device can "do something" with other devices or components. For example, a context "processor configured to execute A, B, and C" may mean a dedicated processor (for example, embedded processor) for executing a corresponding operation, or a generic-purpose processor (for example, central processing unit (CPU) or application processor (AP)) capable of executing corresponding operations by using at least one software program stored in a memory device.

The terms defined in a general dictionary may be interpreted as having the same or similar meaning in a context of related technology, and are not interpreted abnormally or excessively unless clearly defined in the present disclosure. According to situations, the terms defined in the present disclosure cannot be interpreted as excluding the various embodiments of the present disclosure.

An electronic device according to various embodiments of the present disclosure may be a device including a projection or a communication function. For example, the electronic device may be one or a combination of a smart phone, a tablet personal computer (PC), a mobile phone, a video phone, an e-book reader, a desktop PC, a laptop PC, a netbook computer, a personal digital assistant (PDA), a camera, a wearable device (for example, a head-mounted-device (HMD) such as electronic glasses, electronic clothes, and electronic bracelet, an electronic necklace, an electronic accessory, an electronic tattoo, and a smart watch.

According to some embodiments, the electronic device may be a smart home appliance having a projection function. The smart home appliance may include at least one of a television (TV), a digital video disc (DVD) player, an audio player, an air conditioner, a cleaner, an oven, a microwave oven, a washing machine, an air cleaner, a set-top box, a TV box (for example, Samsung HomeSync™, Apple TV™, or Google TV™), game consoles, an electronic dictionary, an electronic key, a camcorder, and an electronic frame.

According to some embodiments, the electronic device may include at least one of various types of medical devices (for example, magnetic resonance angiography (MRA), magnetic resonance imaging (MRI), computed tomography (CT), a scanner, an ultrasonic device and the like), a navigation device, a global positioning system (GPS) receiver, an event data recorder (EDR), a flight data recorder (FDR), a vehicle infotainment device, electronic equipment for a ship (for example, a navigation device for ship, a gyro compass and the like), avionics, a security device, a head unit for a vehicle, an industrial or home robot, an automatic teller machine (ATM) of financial institutions, and a point of sale (POS) device of shops.

According to some embodiments, the electronic device may include at least one of furniture or a part of a building/structure, an electronic board, an electronic signature receiving device, a projector, and various types of measuring devices (for example, a water meter, an electricity meter, a gas meter, a radio wave meter and the like) including a projection function. The electronic device according to various embodiments of the present disclosure may be one or a combination of the above described various devices. Further, the electronic device according to various embodiments of the present disclosure may be a flexible device. It is apparent to those skilled in the art that the electronic device according to various embodiments of the present disclosure is not limited to the above described devices.

The various embodiments disclosed in the specification and drawings are merely presented to easily describe technical contents of the present disclosure and help the understanding of the present disclosure and are not intended to limit the scope of the present disclosure. Therefore, all changes or modifications derived from the technical idea of the present disclosure as well as the various embodiments described herein should be interpreted to belong the scope of the present disclosure.

The electronic device having a waterproof structure for a display module according to various embodiments of this disclosure may include a short range communication module for short range communication. As short range communication technique, Bluetooth, radio frequency identification (RFID), infrared data association (IrDA), ultra wideband (UWB), ZigBee, near field communication (NFC), or the like may be used.

FIG. 1 is a disassembled perspective view illustrating an electronic device according to various embodiments of the present disclosure.

Referring to FIG. 1, the electronic device 100 according to various embodiments of the present disclosure may include a window 122 formed with a transparent or semi-transparent material and exposing outwards, display device 120 having a display 124 (shown in FIG. 2) disposed on the window 122, main frame 140 to which the display device 120 is fixed, sub-frame 160 to which an antenna circuit and a speaker are fixed at the lower part of the main frame 140, electric structure 180 including a battery 182 and a printed circuit board (PCB) 184 which are assembled between the main frame 140 and the sub-frame 160, and back case 200 combined with the main frame 140 at the lower part of the sub-frame 160, in a first direction of the electronic device 100. The main frame 140 and the sub-frame 160 may configure a housing 150 surrounding at least a part of peripherals of the window 122.

Although not shown in the drawing, the back case 200 may further include a display device (not shown) including a transparent window at the rear side and a display disposed on the window, in a second direction of the electronic device 100.

Figure 2:
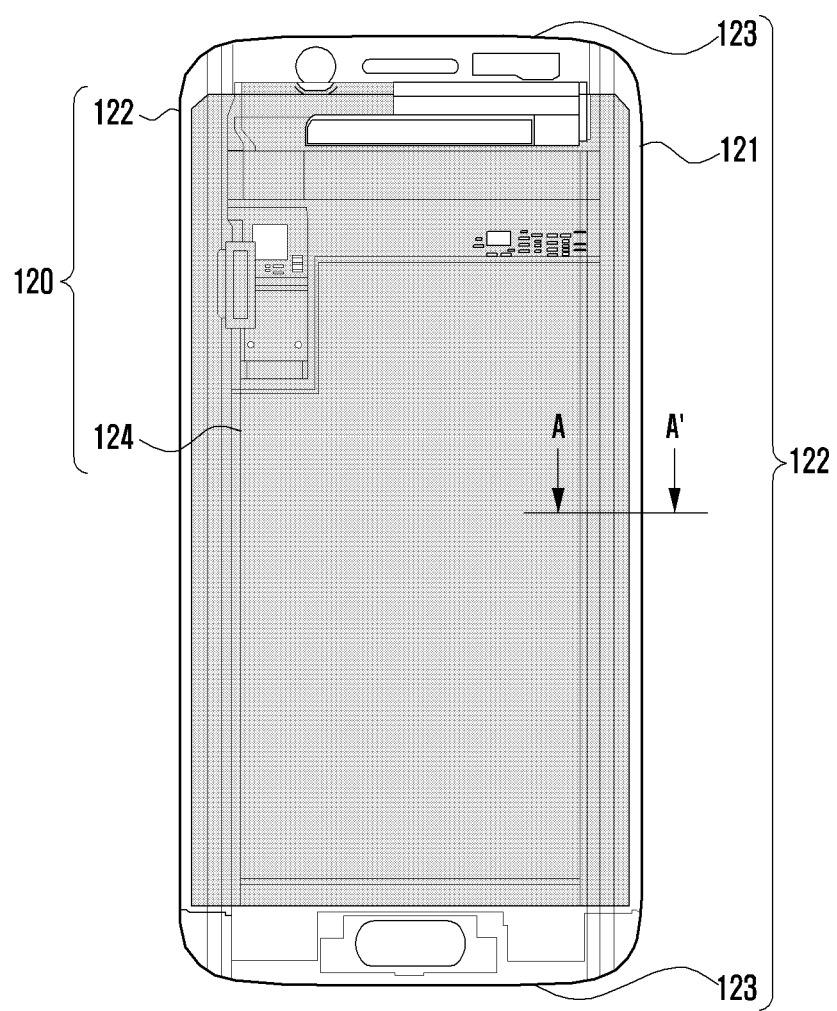
FIG. 2 is a rear view illustrating a display device of an electronic device according to an embodiment of the present disclosure.

FIG. 2 is a rear view illustrating a display device 120 of an electronic device 100 according to various embodiments of the present disclosure.

Referring to FIG. 2, the display device 120 of the electronic device 100 according to an embodiment of the present disclosure may include a transparent or semi-transparent window 122 exposing outwards by forming the front side of the electronic device and a display 124 disposed at the rear side of the window 122.

The window 122 formed with a transparent or semi-transparent material is a display cover formed at the front side of the electronic device, and a screen area of the display 124 can be exposed outwards through the window 122. According to an embodiment of the present disclosure, the display 124 may not be attached to the front side of the window 122 but to the rear side of the window 122. The display 124 may be disposed on or over the rear side of the windows 122, and include a first side and a second side substantially vertical to the first side.

The window 122 of the electronic device 100 according to an embodiment of the present disclosure may include a first area 121 in which the display 124 is disposed and a second area 123 in which the display 124 is not disposed and components such as a speaker and a camera are installed. For example, the second area 123 of the window 122 may include at least one of an upper area extending from the top of the display 124 and a lower area extending from the bottom of the display 124.

Figure 3:
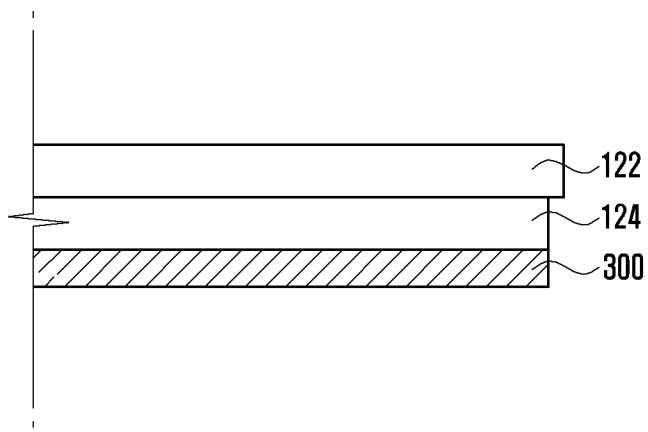
FIG. 3 is a cross-sectional view obtained by cutting along a line A-A' of FIG. 2 according to an embodiment of the present disclosure.

FIG. 3 is a cross-sectional view obtained by cutting along a line A-A' of FIG. 2 according to an embodiment of the present disclosure.

Referring to FIG. 3, the display device 120 of the electronic device 100 according to various embodiments of the present disclosure can be formed in a small size because the size of the window 122 and the size of the display 124 are similar.

According to the small size of the display device 120, the electronic device 100 according to various embodiments of the present disclosure cannot secure a waterproof performance by using a method of the related art of filling the sides of the window 122 covering the front side of the display 124 with a tape, sponge, or bonding. In the method of the related art, a waterproof function is provided by attaching a waterproof tape formed in a rectangular closed loop at the sides of the window 122. However, in an electronic device having a small bezel, side areas of the display 124 extends, and water can penetrate because the right and left areas of waterproof tape formed in a rectangular closed loop disappear. The electronic device 100 according to various embodiments of the present disclosure can secure a waterproof performance in a small bezel structure by forming a waterproof member 300 as a moisture blocking membrane at least at a part of the rear side of the display 124, as shown in FIG. 3.

According to an embodiment of the present disclosure, the waterproof member 300 can form a moisture blocking membrane in order to absorb or block moisture inflowing from the outside of the electronic device 100 by using a tape, sponge, or bonding. According to an embodiment of the present disclosure, the waterproof member 300 can be disposed at least at a part of the display 124.

If the display device 120 is combined with the upper part of the main frame 140 of the housing which is configured with the main frame 140 and the sub-frame 160 of FIG. 1, a step can be formed between the second area 123 of the window 122 (for example, upper and/or lower parts extended from the display 124) and the first area 121 (for example, ends of upper and/or lower parts of the display 124). If at least a part of the rear side of the display 124 is attached only with the waterproof member 300 as a moisture blocking membrane in a state that the step exists, the water proof performance cannot be secured.

Accordingly, in the electronic device 100 according to various embodiments of the present disclosure, the display device 120 can secure waterproof performance by compensating a step with a step compensation member at the outside of the display 124 (i.e., at least at a part of second area 123 of the window 122) and attaching a waterproof tape with a rectangular shape to the first area 121 and the second area 123 of the window 122.

Figure 4:
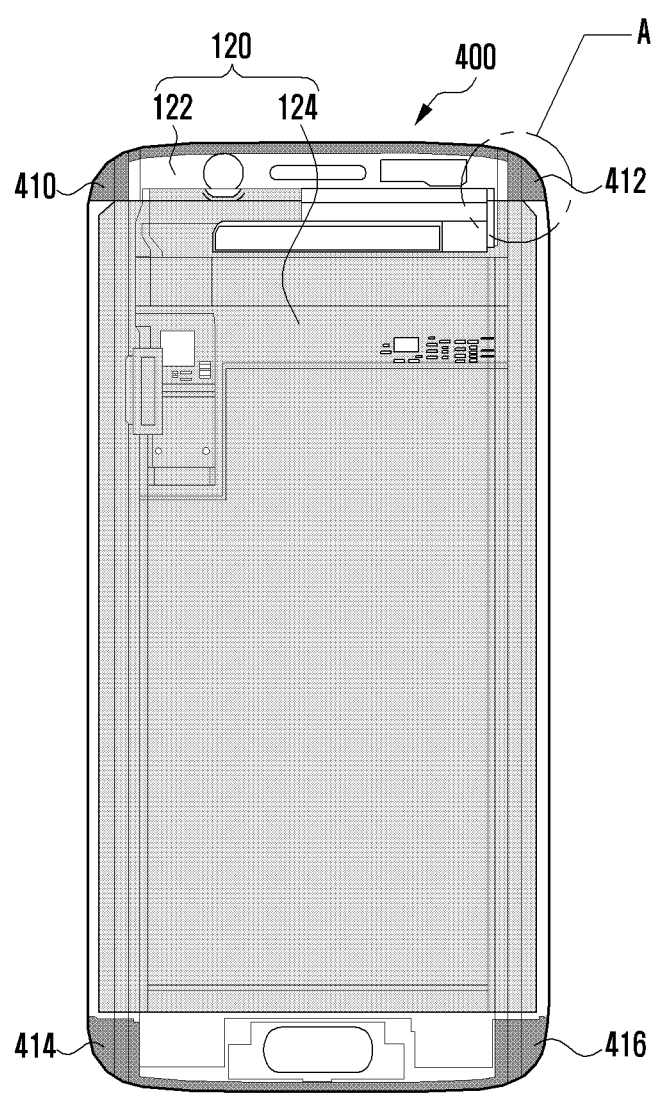
FIG. 4 is a plain view illustrating a display module of an electronic device according to an embodiment of the present disclosure.

FIG. 4 is a plain view illustrating a display module of an electronic device according to an embodiment of the present disclosure.

Referring to FIG. 4, the display device 120 of the electronic device 100 according to an embodiment of the present disclosure may include a plurality of step compensation structures 410, 412, 414 and 416 at the first area 121 (for example, a part corresponding to the display 124) and the second area 123 (for example, outside of the display 124) of the window 122 in order to compensate the step. According to an embodiment of the present disclosure, the display device 120 may include a step compensation member 400 configured with the plurality of step compensation structures 410, 412, 414, and 416 in order to compensate the step of the first area 121 and the second area 123.

According to an embodiment of the present disclosure, the step compensation member 400 may include a polycarbonate (PC) sheet, tape, and sponge, and first to fourth step compensation structures 410, 412, 414, and 416 in the upper and lower areas of the window 122 and at the right and left corner between the upper and lower ends of the display 124. According to an embodiment of the present disclosure, a waterproof member 300 can be attached as a moisture blocking membrane at least at a part of the rear side of the display 124. As described above, an electronic device 100 according to various embodiments of the present disclosure may include the step compensation member 400 as a first member and the waterproof member 300 as a second member in order to block moisture from the outside of the electronic device 100.

According to various embodiments of the present disclosure, the step compensation member 400 may be disposed at least on a part of the window 122 as a first member, and the waterproof member 300 may be disposed at least on a part of the step compensation member 400 and at least on a part of the display 124 as a second member.

According to various embodiments of the present disclosure, the height of the step compensation member 400 and the height of the display 124 may be substantially identical. Further, the width of the step compensation member 400 and the width of the waterproof member 300 may be substantially identical to the length of a first side of the display 124.

According to various embodiments of the present disclosure, the length of the first side of the display 124 may be substantially identical to the width of the window 122.

According to various embodiments of the present disclosure, the step compensation member 400 may be formed at a part where the window 122 and the display device 120 are attached, and the waterproof member 300 may be formed along the whole circumference of the window 122.

According to various embodiments of the present disclosure, the step compensation member 400 as a first member may be formed in an arch shape, and the waterproof member 300 as a second member may be formed in a rectangular shape. For example, the step compensation member 400 having an arch shape may include step compensation structures 410 and 412 located at the upper right and left of the window 122 or step compensation structures 414 and 416 located at the lower right and left of the window 122.

According to various embodiments of the present disclosure, the step compensation member 400 as a first member may include a first part having a first width and a second part having a second width greater than the first width. Here, the second part may be disposed closer to the display 124 than the first part. By disposing the second part having a greater width closer to the display 124, moisture can be blocked more securely.

According to an embodiment of the present disclosure, the step compensation member 400 as a first member may include a non-adhesive material, and the waterproof member 300 as a second member may include an adhesive material. Here, the first member can be formed with polycarbonate.

Figure 5:
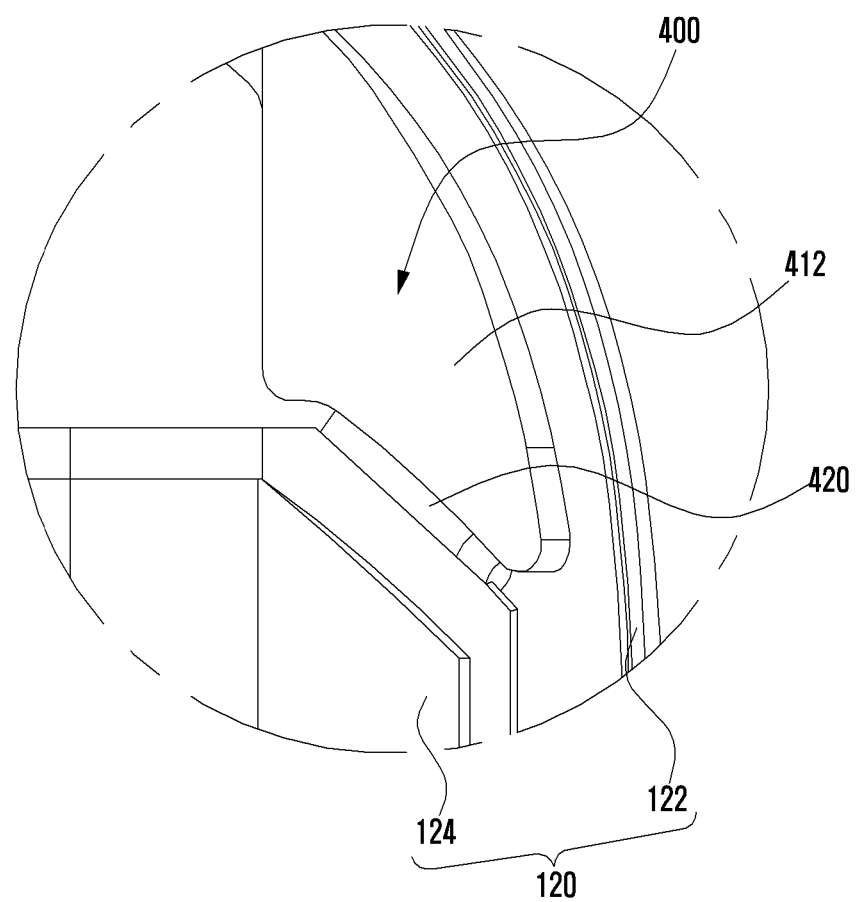
FIG. 5 is an expanded view illustrating a detailed part "A" of FIG. 4 according to an embodiment of the present disclosure.

FIG. 5 is an expanded view illustrating a detailed part "A" of FIG. 4 according to an embodiment of the present disclosure.

Referring to FIG. 5, according to an embodiment of the present disclosure, gaps between each step compensation structure 412 of the step compensation member 400 and the display 124 of the display device 120 can be sealed by using a filler 420 (for example, bonding, silicon, or resin).

According to an embodiment of the present disclosure, the filler 420 can prevent moisture penetration between the step compensation structure 412 and the display 124.

According to an embodiment of the present disclosure, a third member including an adhesive material may be further included between the window 122 and the step compensation member 400, and a fourth member (for example, filler 420) including an adhesive material may be further included between the display 124 and the step compensation member 400. For example, the fourth member can be formed in an integral type by using a bonding material or resin so that the step compensation member 400 and the display device 120 can bond to a main set of the electronic device, and the gaps between the step compensation member 400 and display can be sealed in a single operation.

Figure 6:
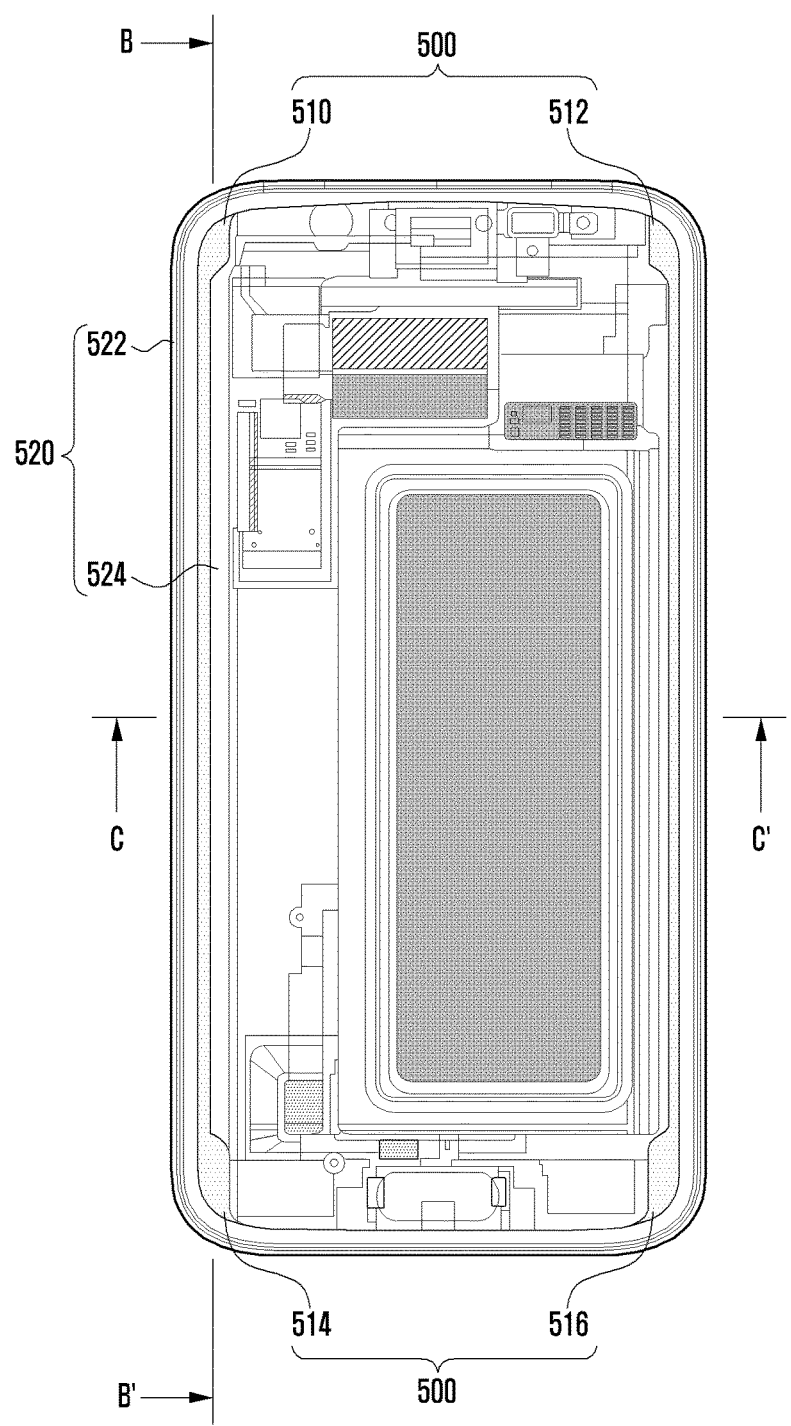
FIG. 6 is a plain view illustrating a display of an electronic device according to an embodiment of the present disclosure.
Figure 7:
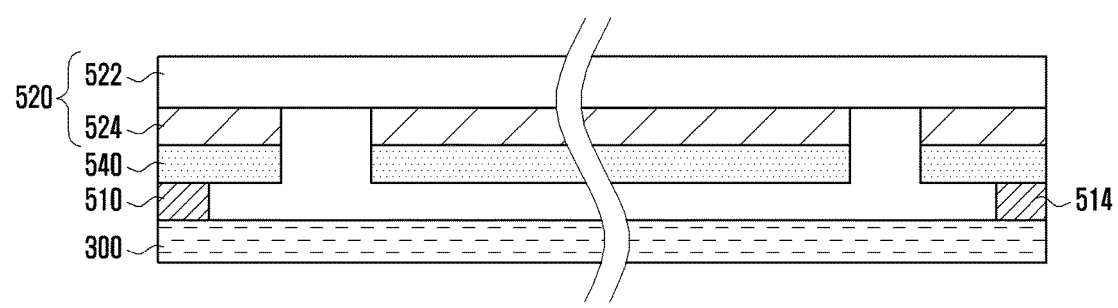
FIG. 7 is a cross-sectional view obtained by cutting along a line B-B' of FIG. 6 according to an embodiment of the present disclosure.

FIG. 6 is a plain view illustrating a display of an electronic device according to an embodiment of the present disclosure. FIG. 7 is a cross-sectional view obtained by cutting along a line B-B' of FIG. 6 according to an embodiment of the present disclosure. FIG. 6 shows a state that the waterproof member 300 did not adhere and FIG. 7 shows a state that the center part is omitted.

Referring to FIGS. 6 and 7, the display device 520 according to various embodiments of the present disclosure may include a windows 522 which is formed with a transparent or semitransparent material as a display cover and exposed to the outside of the electronic device 100, and a display 524 which is integrally formed with step compensation member 500 disposed at the rear side of the window 522. Corresponding to the steps formed between the upper and lower area of the window 522 and the upper and lower ends of the display 524, the step compensation member 500 integrated with the display 524 may include step compensation structures 510 and 514 located at the upper and lower areas of the window 522 and at the left corners between the upper and lower ends of the display 524, and step compensation structures 512 and 516 located at the right corners as shown in FIG. 4.

Referring to FIG. 7, according to an embodiment of the present disclosure, a flexible printed circuit board (FPCB) 540 may be included at the rear side of the display 524. Similarly, the step compensation structures 510 and 514 may be included at the left corners of the FPCB 540 and other step compensation structures (not shown) may be included at the right corners.

The display device 520 according to the various embodiments of FIGS. 6 and 7 can be formed with a moisture blocking membrane by attaching a waterproof member 300 using a tape, sponge, or bonding to the step compensation structures 510 and 540 located at the upper, lower, right, and left corners of the rear side of the display 524.

Figure 8:
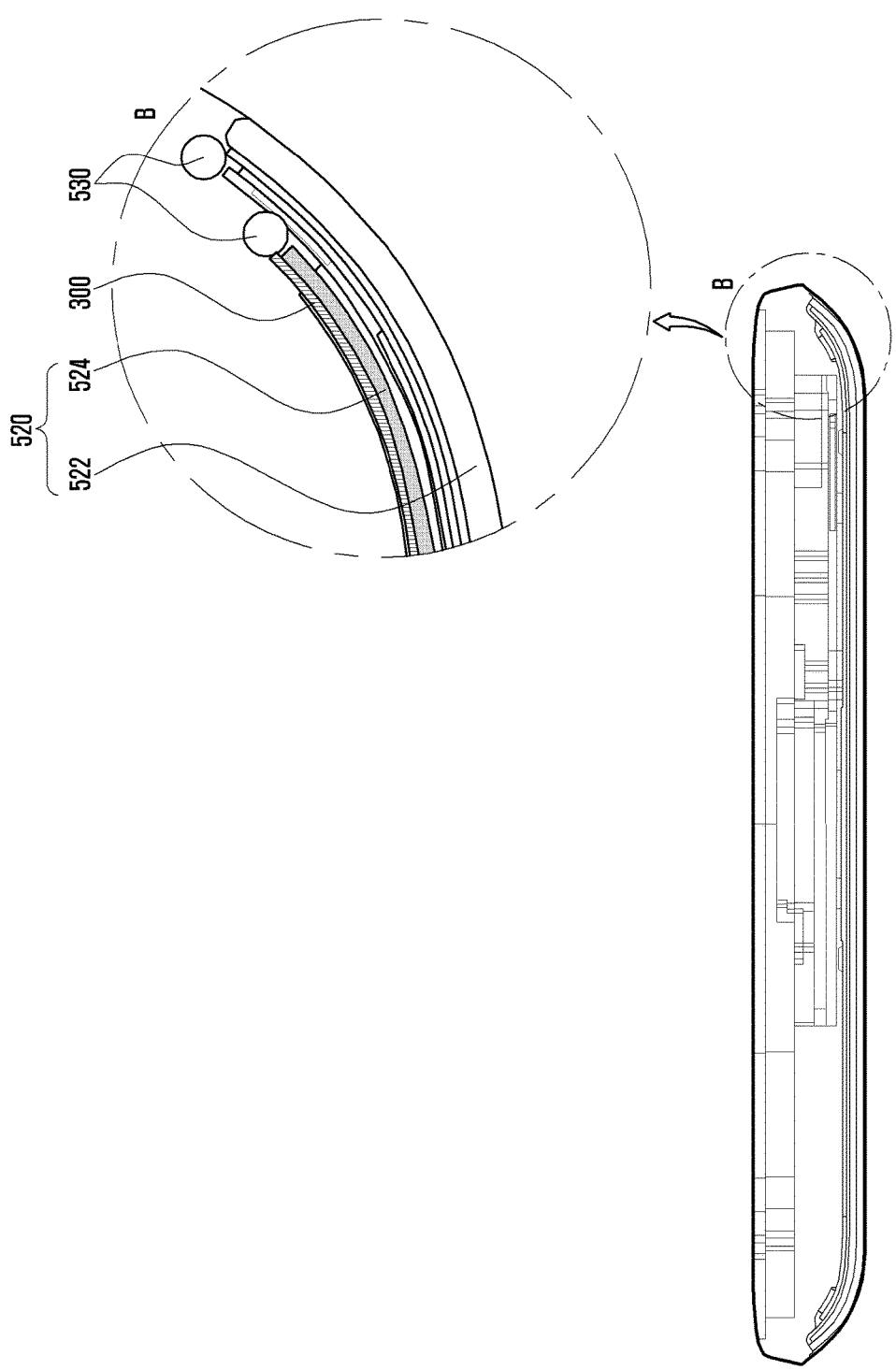
FIG. 8 is a cross-sectional view obtained by cutting along a line C-C' of FIG. 6, which illustrates a detailed part "B" by expanding according to an embodiment of the present disclosure.

FIG. 8 is a cross-sectional view obtained by cutting along a line C-C' of FIG. 6, which illustrates a detailed part "B" by expanding according to an embodiment of the present disclosure.

Referring to FIG. 8, the display device 520 may have a multi-layer structure. The display device 520 formed in a multi-layer structure can be processed to have a water-repellent function by applying a chemical material 530 such as a resin and coating to the side area of the multi-layer structure before or after attaching the window 522.

Further, according to an embodiment of the present disclosure, a waterproof function can be obtained with the water-repellent processing by applying the chemical material 530 such as a resin and coating to the side area of the display device 520.

Similar to the various embodiments of FIGS. 6 and 7, a moisture blocking membrane can be provided by applying only the waterproof member 300 such as a tape, sponge, or bonding to the whole area of the rear side of the display 524.

According to various embodiments of the present disclosure, an electronic device comprises: a window formed with a transparent or semi-transparent material at the outside of the electronic device; a display disposed on or over the window and having a second side substantially vertical to a first side; and a first member and a second member configured to absorb or block moisture inflowing from the outside of the electronic device, wherein the window includes a first area corresponding to the display and a second area corresponding to the outside of the display, the first member is disposed at least on a part of the second area, the second member is disposed at least on a part of the first member and at least on a part of the display, the height of the first member is substantially identical to the height of the display, and the width of the first member or the height of the second member is substantially identical to the first side of the display.

The length of the first side may be substantially identical to the width of the window.

The first member may be formed substantially identical to the width of the window and along a partial circumference of the windows.

The first member may have an arch shape and the second member has a rectangular shape.

The first member may include a non-adhesive material and the second member comprises an adhesive material.

The first member may be formed with polycarbonate.

The electronic device further may include a third member having an adhesive material between the window and the first member.

The electronic device further may include a fourth member having an adhesive material between the display and the first member.

The first member may include a first part having a first width and a second part having a second width greater than the first width.

The second part may be disposed closer to the display than the first part.

Figure 9:
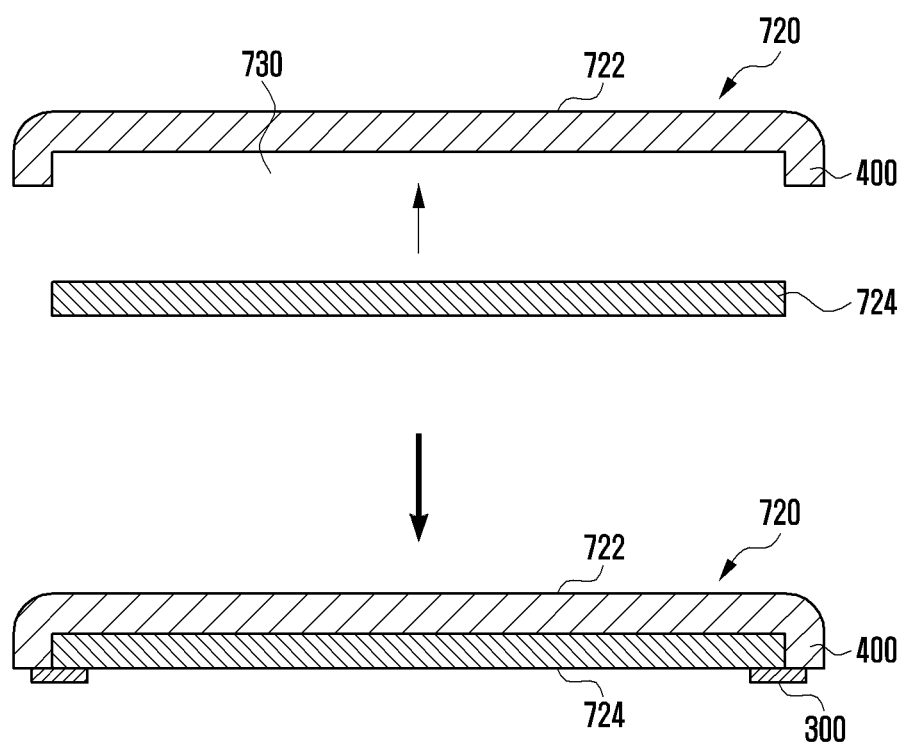
FIG. 9 is a schematic drawing illustrating a display unit of an electronic device according to an embodiment of the present disclosure.

FIG. 9 is a schematic drawing illustrating a display unit of an electronic device according to an embodiment of the present disclosure.

Referring to FIG. 9, the display device 720 according to an embodiment of the present disclosure can be formed by integrating a windows and a step compensation member.

According to an embodiment of the present disclosure, the display device 720 can be processed by forming a dent part 730 in the window 722, forming a step compensation member 400 on the dent part 730 integrally, filling a display 724 into the dent part 730, and attaching a waterproof member to a boundary area between the dent part 730 and the display 724 which is formed by filling the display 724 into the dent part 730. Therefore, the display device 720 can be provided with a moisture blocking membrane without using a step compensation structure, because the display 724 is filled in the dent part 730 of the window 722 and the window 722, or an area including the window 722 and at least a part of the display 724 is surrounded by the moisture blocking membrane.

Figure 10A:
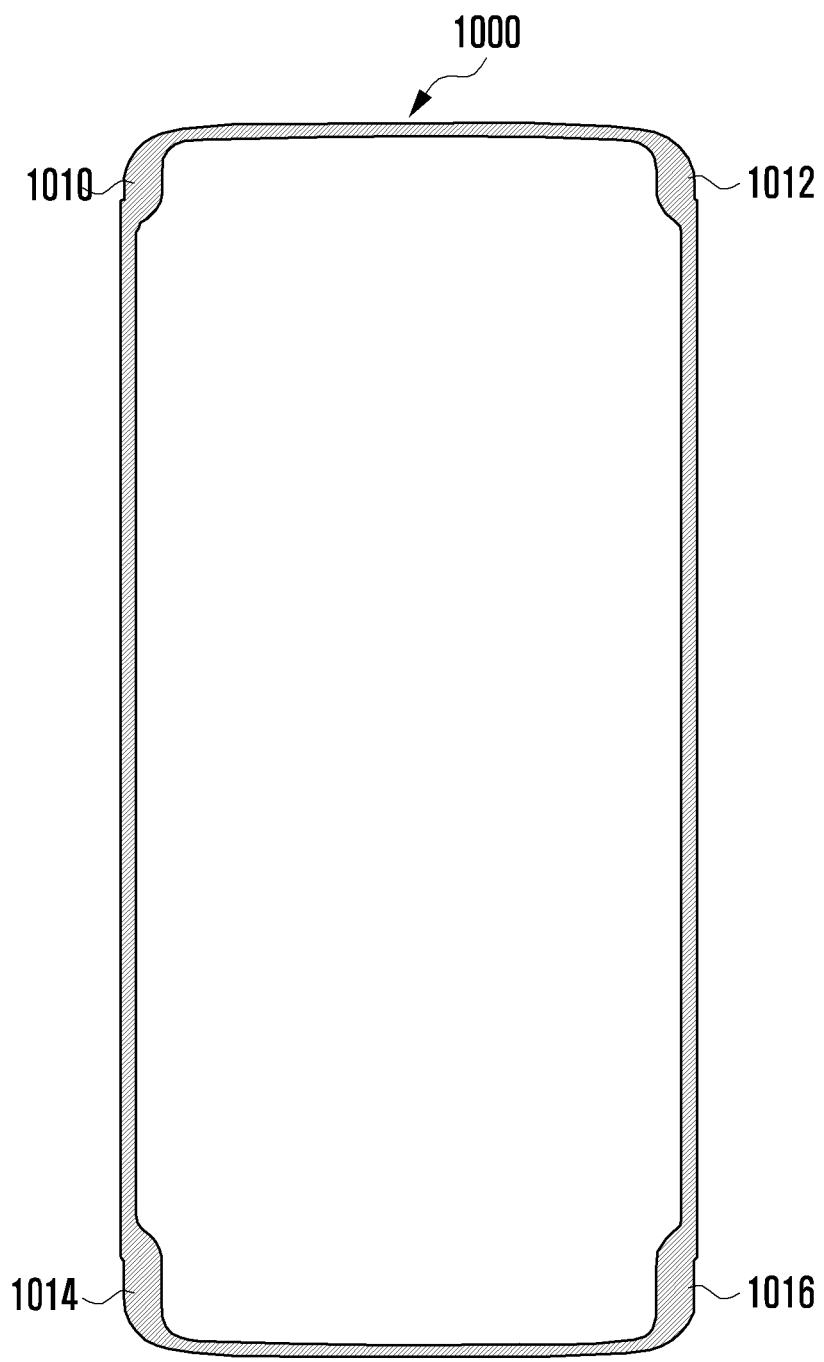
FIGS. 10A, 10B, and 10C are rear views illustrating a display unit of an electronic device according to various embodiments of the present disclosure.
Figure 10B:
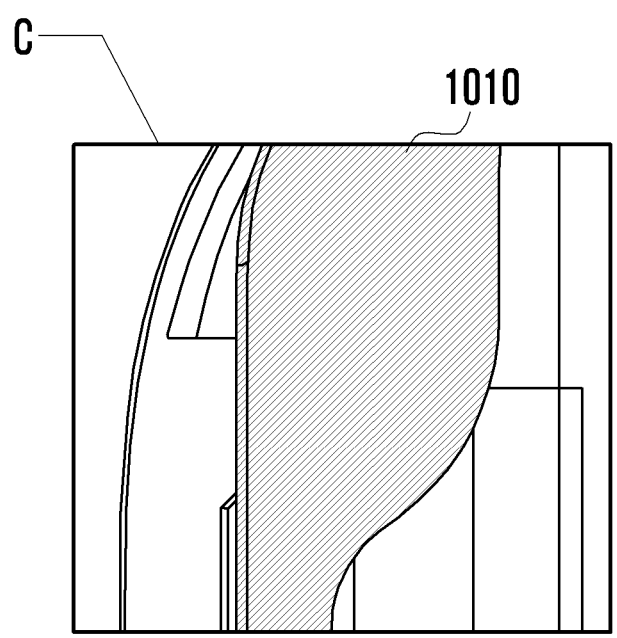
Figure 10C:
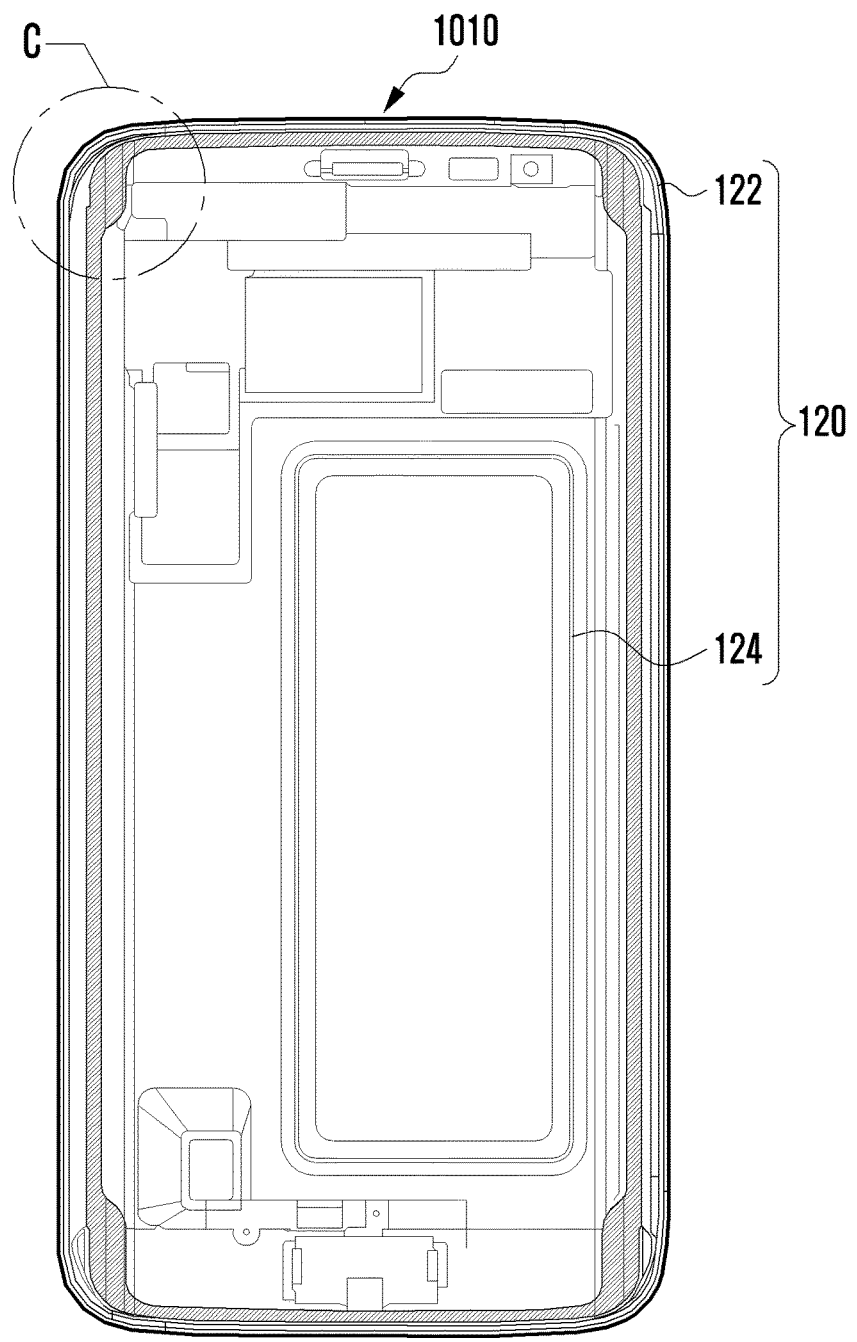

FIGS. 10A to 10C illustrates a display unit of an electronic device according to various embodiments of the present disclosure.

Referring to FIG. 10A, a step compensation member 1000 according to various embodiments of the present disclosure has a rectangular shape and may include step compensation structures 1010, 1012, 1014, and 1016 integrally formed at the upper, lower, right, and left corners of the rectangular shape. FIG. 10B shows a state that the step compensation member 1000 is attached to the display device 120. According to an embodiment of the present disclosure, the display device 120 can secure a waterproof performance for stepped areas formed at the upper, lower, right, and left corner of the display device 120 and between the window 122 and the display 124 by attaching the step compensation member 1000 including step compensation structures 1010, 1012, 1014, and 1016. FIG. 10B is a partial expanded drawing of the area "C" in FIG. 10C.

According to various embodiments of the present disclosure, an electronic device comprises: a window formed with a transparent or semi-transparent material exposing to the outside of the electronic device; a display disposed on the window; and a first member and a second member configured to absorb or block moisture inflowing from the outside of the electronic device, wherein the first member is disposed at upper right and left areas and lower right and left areas of the window attached to the display, or formed by integrating with one of the display or the window.

The first member may have an arch shape and the second member may have a rectangular shape.

The first member may include a non-adhesive material formed with polycarbonate and the second member may include an adhesive material.

The electronic device further may include a third member having an adhesive material between the window and the first member.

The electronic device further may include a fourth member having an adhesive material between the display and the first member.

The first member may include a first part having a first width, and a second part having a second width greater than the first width and formed at an outer side of the first part.

Figure 11:
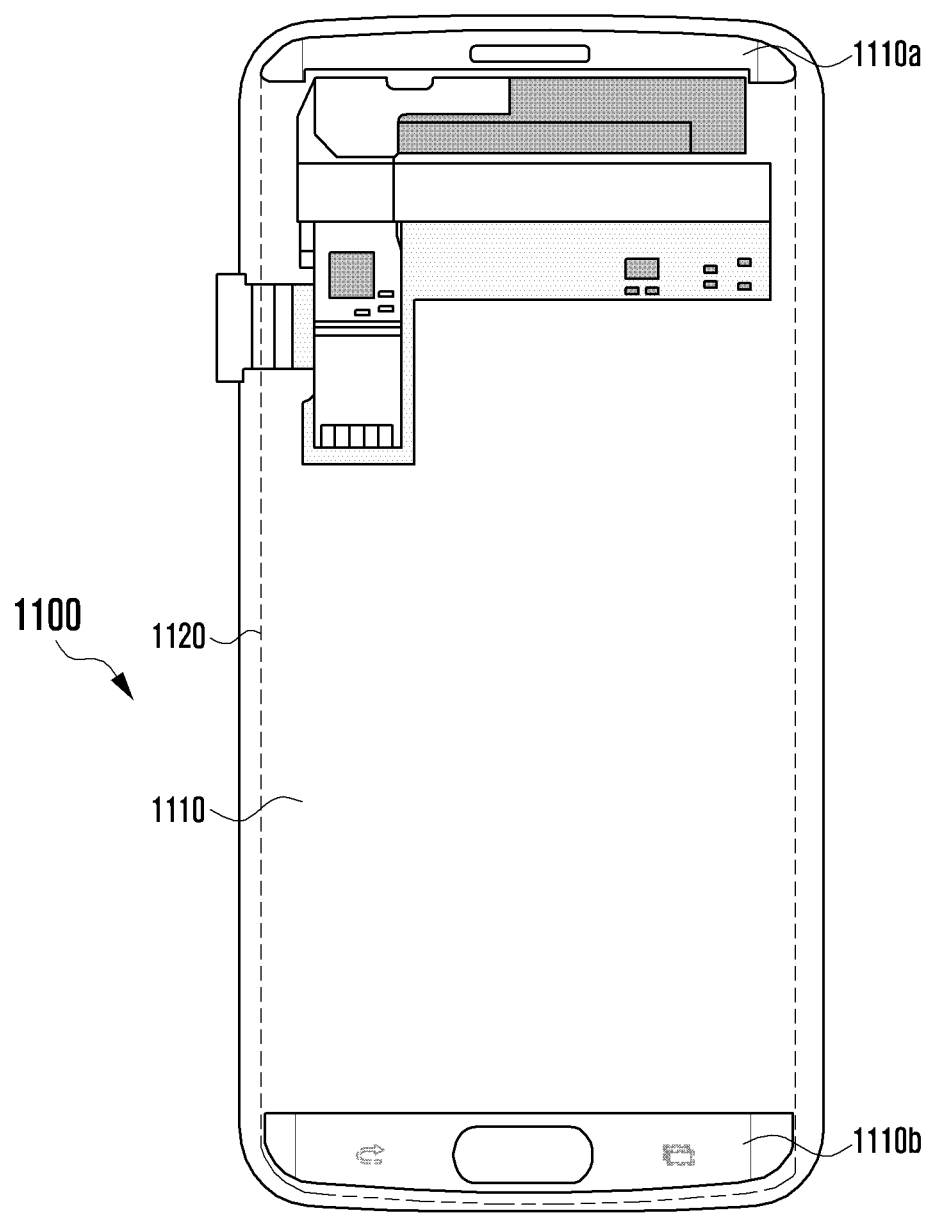
FIG. 11 is a rear view illustrating a display unit of an electronic device according to an embodiment of the present disclosure.

FIG. 11 illustrates a display unit of an electronic device according to an embodiment of the present disclosure.

Referring to FIG. 11, a display device 1100 of an electronic device having a waterproof structure according to various embodiments of the present disclosure may include a windows (not shown) having a transparent or semi-transparent material exposed to the outside of the electronic device and a display (not shown) disposed on the windows, and the display may have a first side and a second side substantially vertical to the first side. Further, the display can have a round shape.

The electronic device according to an embodiment of the present disclosure may further include a first member 1110 disposed on the whole area of the windows and a second member 1120 disposed on the first member 1110.

The first member 1110 includes an opening where devices such as a speaker and a microphone are located, and may have a structure having a size corresponding to the whole size of the windows.

Here, the first member 1110 may include a first opening 1110a disposed at the outside of the first side of the display and a second opening 1110b disposed at the outside of the second side of the display. The second member 1120 may be formed with a waterproof material, and moisture inflowing from the outside of the electronic device can be absorbed or blocked by using the second member 1120 substantially surrounding the peripheral area of the electronic device.

According to an embodiment of the present disclosure, the first member 1110 has a structure that a step compensation member is omitted, and may be one of a shielding layer, heat sink, and FPCB covering the whole area of a window.

According to various embodiment of the present disclosure, an electronic device comprises: a window formed with a transparent or semi-transparent material exposing to the outside of the electronic device; a display disposed on the window, and having a first side and a second side substantially parallel to the first side; a first member disposed substantially on the whole area of the windows; and a second member disposed on the first member, wherein the first member comprises a first opening disposed at the outside of the first side and a second opening disposed at the outside of the second side, and the second member absorbs or shuts off moisture from the outside of the electronic device.

The first member may be formed with one of a shielding layer, heat sink, and FPCB.

The length of the first side may be substantially identical to the width of the windows.

The first member may be formed substantially identical to the width of the window and along a partial circumference of the windows.

In the above description, the display device according to various embodiments of the present disclosure is applied to the front side of the electronic device. Although not shown in the drawings, the display device can be applied to both the front and rear sides of the electronic device. In this case, the display device can be can be applied to a back case of the electronic device or directly to the rear side of the electronic device without inter-positioning the back case. Both the display devices applied to the front and rear sides of the electronic device can be fixed to a main frame of the electronic device.

A waterproof structure of a bezel-less display device and an electronic device having the same according to various embodiments of the present disclosure utilizes a method and a shape of combining a display device and an electronic device, and a moisture blocking membrane is applied to a section of the rear side of a display. A water proof function can be obtained without increasing the size of the electronic device and each member of the electronic device can be formed in various shapes.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a window formed with a transparent or semi-transparent material at an outside of the electronic device;
   a display disposed on or over the window and having a second side substantially vertical to a first side; and
   a first member and a second member configured to absorb or block moisture inflowing from the outside of the electronic device,
   wherein the window includes:
   a first area corresponding to the display, and
   a second area corresponding to the outside of the display,
   wherein the first member is disposed at least on a part of the second area,
   wherein the second member is disposed at least on a part of the first member and at least on a part of the display,
   wherein a height of the first member is substantially identical to a height of the display,
   wherein a width of the first member or a height of the second member is substantially identical to the first side of the display, and
   wherein the first member is formed substantially identical to a width of the window and along a partial circumference of the window.

2. The electronic device of claim 1, wherein a length of the first side is substantially identical to a width of the window.

3. The electronic device of claim 1, wherein the first member has an arch shape and the second member has a rectangular shape.

4. The electronic device of claim 1, wherein the first member comprises a non-adhesive material and the second member comprises an adhesive material.

5. The electronic device of claim 4, wherein the first member is formed with polycarbonate.

6. The electronic device of claim 1, further comprising a third member having an adhesive material between the window and the first member.

7. The electronic device of claim 1, further comprising a fourth member having an adhesive material between the display and the first member.

8. The electronic device of claim 1, wherein the first member comprises a first part having a first width and a second part having a second width greater than the first width.

9. The electronic device of claim 8, wherein the second part is disposed closer to the display than the first part.

10. An electronic device comprising:
    a window formed with a transparent or semi-transparent material exposing to an outside of the electronic device;
    a display disposed on the window, and having a first side and a second side substantially parallel to the first side;
    a first member disposed substantially on an entire area of the window; and
    a second member disposed on the first member,
    wherein the first member comprises a first opening disposed at an outside of the first side and a second opening disposed at an outside of the second side,
    wherein the second member absorbs or shuts off moisture from the outside of the electronic device, and
    wherein the first member is formed substantially identical to the width of the window and along a partial circumference of the windows.

11. The electronic device of claim 10, wherein the first member is formed with at least one of a shielding layer, heat sink, and flexible printed circuit Board (FPCB).

12. The electronic device of claim 10, wherein a length of the first side is substantially identical to a width of the window.

13. An electronic device comprising:
    a window formed with a transparent or semi-transparent material exposing to an outside of the electronic device;
    a display disposed on the window; and
    a first member and a second member configured to absorb or block moisture inflowing from the outside of the electronic device; and
    a third member having an adhesive material between the display and the first member, wherein the first member is disposed at upper right and left areas and lower right and left areas of the window attached to the display, or formed by integrating with one of the display or the window.

14. The electronic device of claim 13, wherein the first member has an arch shape and the second member has a rectangular shape.

15. The electronic device of claim 13, wherein the first member comprises a non-adhesive material formed with polycarbonate and the second member comprises an adhesive material.

16. The electronic device of claim 13, further comprising a fourth member having an adhesive material between the window and the first member.

17. The electronic device of claim 13, wherein the first member comprises a first part having a first width, and a second part having a second width greater than the first width and formed at an outer side of the first part.

* * * * *